UNITED STATES PATENT OFFICE.

ALEXANDER WARNER, OF NEW YORK, N. Y.

METHOD OF PRESERVING FOOD.

SPECIFICATION forming part of Letters Patent No. 256,084, dated April 4, 1882.

Application filed February 28, 1881. (No specimens.)

*To all whom it may concern:*

Be it known that I, ALEXANDER WARNER, of the city and county of New York, in the State of New York, have invented a new and Improved Method of Preserving Animal and Vegetable Substances, of which the following is a specification.

The invention is more particularly intended for the preservation of smoked hams against mold, from insects, and against deterioration in general; but it is also applicable with equal advantage to the preservation of other cured meats, either cooked or uncooked, and also may be applied to the preservation of vegetable articles of food when protection from the atmosphere tends to preservation.

It consists in the enveloping or inclosing of the ham, piece of meat, or other article in a close-fitting, air-tight, seamless integument made of a composition of paper-pulp and a vegetable gum which is rendered adhesive by the addition of water, such composition being applied to the surface of the ham or other article by spreading it over said article by hand or other means, or by dipping the article into it and allowing it to dry. This spreading on or dipping may be performed one or more times until an integument of the desired thickness has been produced, each layer being allowed to partly or wholly dry before another layer is applied.

The coating or covering may be applied directly to the surface of the ham or other piece of meat or article, or said surface may be first covered with paper, muslin, or cloth, and the coating then applied over it. A preparatory covering of some fabric is especially desirable when the pulpy coating is to be applied by dipping. The seamless fibrous integument thus applied to all parts of the surface of the ham, piece, or article to be preserved, when dried, conforms and lies close to said surface, however irregular it may be, and effectually excludes the air therefrom, and is of such nature that it will not be easily broken or displaced by rough handling or transportation; and I believe it will form the most effective protection ever applied to hams and other smoked meats to preserve them against becoming moldy and from general deterioration.

The composition which I use for the seamless integument is paper-pulp made of any ordinary vegetable fiber, and gum-tragacanth, reduced to a pulp with water.

The proportions of such a composition may be as follows: Take twenty-five pounds of a mucilage of gum-tragacanth, consisting of twenty parts, by weight, of gum-tragacanth to one hundred parts of water, and add this mucilage to one hundred pounds of the vegetable fiber, in the condition and form of paper-pulp, and thoroughly mix these ingredients together; or, instead of the mucilage of gum-tragacanth, the same proportion may be used of a mucilage of gum-arabic, consisting of sixty-six pounds of gum to one hundred pounds of water. These proportions may, however, be considerably varied, or other vegetable gum or material which becomes adhesive by the addition of water may be substituted for gum-tragacanth or gum-arabic, to give tenacity to the composition for the seamless fibrous integument.

I do not claim the covering of hams or other articles of food with fabrics of the nature of bags or wrappers; nor do I claim broadly coating such articles with plastic composition; but

What I claim is—

The method, substantially as herein described, of preserving hams and other articles of food, consisting in coating their exteriors with paper-pulp and a vegetable gum which is rendered adhesive by the addition of water, such coating when dried forming an air-tight seamless integument, as herein set forth.

ALEXANDER WARNER.

Witnesses:
FREDK. HAYNES,
A. C. WEBB.